(12) United States Patent
Zhou et al.

(10) Patent No.: US 9,330,411 B2
(45) Date of Patent: May 3, 2016

(54) HIGH-PERFORMANCE GRAPH ANALYTICS ENGINE MAKING RECOMMENDATIONS USING A FINITE STATE MACHINE/FSM, BITMASKS, AND GRAPHS WITH EDGES REPRESENTING PURCHASES, AND VERTICES REPRESENTING CUSTOMERS AND PRODUCTS

(71) Applicant: Palo Alto Research Center Incorporated, Palo Alto, CA (US)

(72) Inventors: Rong Zhou, San Jose, CA (US); Daniel Davies, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 405 days.

(21) Appl. No.: 14/039,941

(22) Filed: Sep. 27, 2013

(65) Prior Publication Data
US 2015/0095182 A1    Apr. 2, 2015

(51) Int. Cl.
*G06F 17/00*    (2006.01)
*G06Q 30/06*    (2012.01)
*H04N 21/466*   (2011.01)

(52) U.S. Cl.
CPC ....... *G06Q 30/0631* (2013.01); *H04N 21/4668* (2013.01)

(58) Field of Classification Search
CPC  G06Q 30/0631; G06N 5/022; H04N 21/4668
USPC ................................. 706/12, 45, 62
See application file for complete search history.

(56) References Cited

U.S. PATENT DOCUMENTS

| 2009/0105560 | A1* | 4/2009 | Solomon | A61B 5/0002 600/301 |
| 2014/0280359 | A1* | 9/2014 | Baecklund | G06F 17/30958 707/798 |
| 2015/0006316 | A1* | 1/2015 | Zhou | G06Q 30/0631 705/26.7 |
| 2015/0006457 | A1* | 1/2015 | Lambert | G06N 5/022 706/46 |
| 2015/0058462 | A1* | 2/2015 | Tafel | G06F 17/30058 709/223 |

OTHER PUBLICATIONS

Low, Yucheng et al., "GraphLab: A New Framework for Parallel Machine Learning", 2010, http://www.select.cs.cmu.edu/publications/scripts/papers.cgi?Low+al:uai10graphlab.

\* cited by examiner

*Primary Examiner* — David Vincent
(74) *Attorney, Agent, or Firm* — Shun Yao; Park, Vaughan, Fleming & Dowler LLP

(57) ABSTRACT

One embodiment of the present invention provides a system for generating a product recommendation. During operation, the system receives graph data indicating vertices and edges of the graph. The vertices represent customers and products and the edges represent purchases. The system then receives a query of the graph to determine a product recommendation. Next, the system generates a finite-state machine (FSM) based on the query, executes the query, and determines whether a current state of the FSM is a traversal state. In response to the current state being a traversal state, the system generates a traversal FSM. The system then searches the traversal FSM for a nearest future traversal state, generates a bitmask for the future traversal state, and utilizes the generated bitmask when executing the future traversal state to generate the product recommendation.

25 Claims, 10 Drawing Sheets

HIGH-PERFORMANCE GRAPH ANALYTICS ENGINE MAKING RECOMMENDATIONS USING A FINITE STATE MACHINE/FSM, BITMASKS, AND GRAPHS WITH EDGES REPRESENTING PURCHASES, AND VERTICES REPRESENTING CUSTOMERS AND PRODUCTS

The present disclosure is related to U.S. patent application Ser. No. 13/932,377, titled "System and Method for Parallel Search on Explicitly Represented Graphs," by inventor Rong Zhou, filed 1 Jul. 2013), the disclosure of which is hereby incorporated by reference herein.

BACKGROUND

1. Field

The present disclosure relates to graph queries and other analytics computations. More specifically, this disclosure relates to a method and system for scalable processing of graph queries and other analytics applications.

2. Related Art

Analytics algorithms and applications often have to deal with graphs, a general data structure ideally suited for modeling various real-world objects, events, facts and their relations. With big data analytics being at the forefront of algorithm research and business innovations, the ability to process big graph data becomes increasingly important, yet standard approaches to big data such as Hadoop do not scale well on graphs. This is because graphs usually do not fit nicely into the same map-reduce pattern of computation assumed by Hadoop or similar big data platforms. Such an "impedance mismatch" motivated the development of dedicated analytics packages or libraries specifically designed for graphs, such as Giraph, GraphLab, Boost Graph Library (BGL), and Neo4j.

Open-source graph tools like BGL and Neo4j do not scale well in comparison to other high-performance graph engines. Giraph is built on top of Hadoop's map-reduce framework, and it remains to be seen whether Giraph can meet the speed requirements for big graphs. GraphLab is an open-source package for machine learning with a parallel programming abstraction targeted for sparse iterative graph algorithms. In the original C/C++ implementation, the inventors of GraphLab benchmarked its performance against a comparable Hadoop implementation with the following results: with 16 processors, GraphLab completed a Co-Expectation-Maximization (Co-EM) task in less than 30 minutes. The same task took Hadoop 7.5 hours, using an average of 95 central processing units (CPUs). Wikipedia states that GraphLab is about 50× faster than Mahout, a Hadoop-based machine learning implementation. Although GraphLab shows improvements over previous tools, yet more scalable and extensible tools are needed for analyzing big graph data.

SUMMARY

One embodiment of the present invention provides a system for generating a product recommendation. During operation, the system initially receives graph data indicating vertices and edges of the graph. The vertices represent customers and products and the edges represent purchases. The system then receives a query of the graph to determine a product recommendation. Next, the system generates a finite-state machine (FSM) based on the query, executes the query, and determines whether a current state of the FSM is a traversal state. In response to the current state being a traversal state, the system generates a traversal FSM. The system then searches the traversal FSM for a nearest future traversal state, generates a bitmask for the future traversal state, and utilizes the generated bitmask when executing the future traversal state to generate the product recommendation.

In a variation on this embodiment, the system determines whether to perform pull or push traversals by computing a ratio $\alpha \cdot \beta$, in which $\alpha$=a ratio between a number of sender vertices and a total number of vertices of the graph, and $\beta$=a ratio between average random write time and average random read time of the computer executing the method. The system performs push traversals if $\alpha \cdot \beta < 1$, and performs pull traversals if $\alpha \cdot \beta > 1$.

In a variation on this embodiment, the query of the graph is expressed with a declarative language.

In a variation on this embodiment, searching for a nearest future traversal state further comprises determining that the current traversal state is compatible with the nearest future traversal state in that the current traversal state and the nearest future traversal state are associated with equal graphs.

In a variation on this embodiment, generating the bitmask comprises setting bit flags associated with vertex ranges according to an equation $\lfloor (ID(v)-v_{min\text{-}src})/n \rfloor = p$, wherein $ID(v)$ is an identifier value for vertex v, $v_{min\text{-}src}$ is a minimum identifier value of a set of source vertices, n is average number of vertices assigned to each processor, and p is an identifier value for a processor.

In a variation on this embodiment, generating the traversal FSM further comprises applying a total ordering to one or more states of the FSM to generate states of the traversal FSM.

In a variation on this embodiment, the query includes both partition-bounded primitives and partition-unbounded primitives, and the graph includes multiple edge partitions, and the system performs additional steps that include determining whether a primitive is partition-bounded or partition-unbounded. Upon determining that the primitive is partition-bounded, the system assigns each processor to a range of vertices $\in [v^P_{min\text{-}src}, v^P_{max\text{-}src}]$, where $v^P_{min\text{-}src}$ and $v^P_{max\text{-}src}$ are a minimum integer identifier and a maximum integer identifier of source vertices in a graph partition p. Furthermore, upon determining that the primitive is partition-unbounded, for each partition, the system assigns vertices to processors according to an equation $\lfloor (ID(v)-v_{min\text{-}src})/n \rfloor = p$, in which $ID(v)$ is an identifier value for vertex v, $v_{min\text{-}src}$ is a minimum identifier value of a set of source vertices, n is average number of vertices assigned to each processor, and p is an identifier value for a processor.

In a further variation, the partition-bounded primitive is a push primitive and the partition-unbounded primitive is a pull primitive.

In a variation on this embodiment, the system receives data indicating a new primitive and input/output arguments of the new primitive, and the system adds the new primitive to a set of primitives.

BRIEF DESCRIPTION OF THE FIGURES

In the figures, like reference numerals refer to the same figure elements.

DETAILED DESCRIPTION

Figure 1:
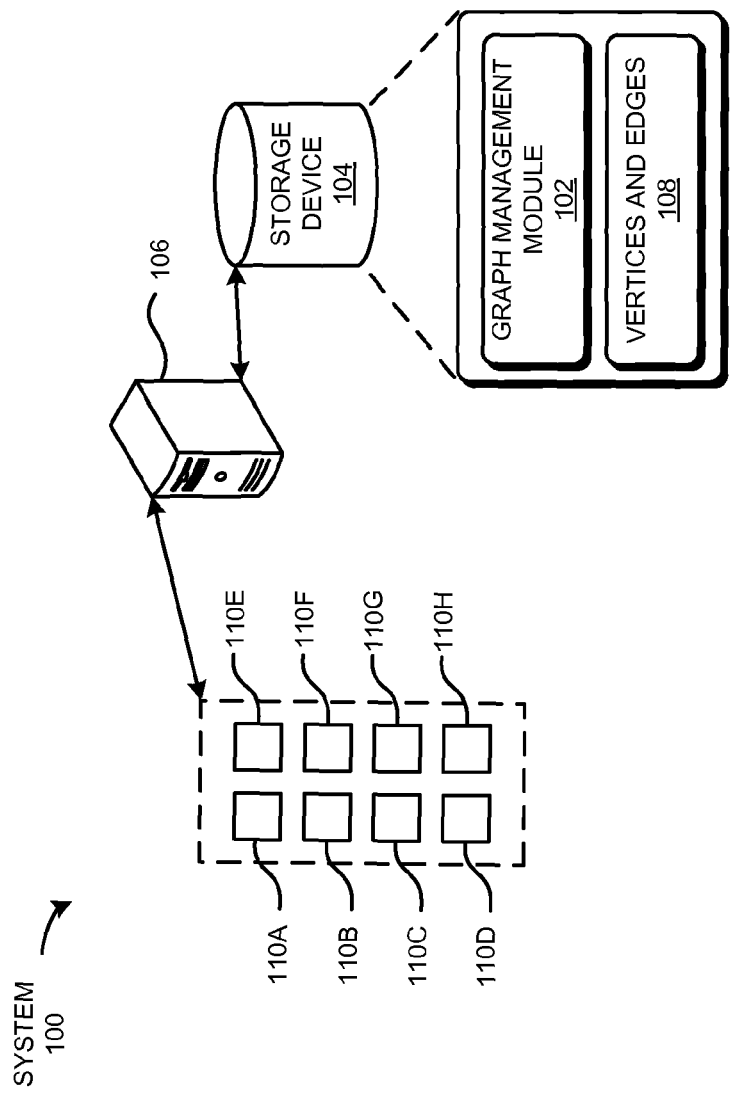
FIG. 1 presents a block diagram illustrating an exemplary architecture of a graph computation system utilizing the techniques disclosed herein, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of integrating scalable dynamic vertex-to-processor mapping into a general-purpose graph analytics engine by generating traversal finite-state machines (FSMs) that facilitate efficient and correct traversal step computations. The engine forms part of a graph computation system that maximizes the use of processor resources by dynamically assigning vertices to processors for each traversal step, unlike standard systems that leaves some processors idle with static assignments. With the traversal FSM, the system can ensure that the system correctly executes a future traversal step despite the presence of an intervening non-graph-centric primitive that invalidates a bitmask generated for the future traversal step. The traversal FSM also allows the system to perform branch prediction so that the system may generate the proper bitmask when multiple compatible future steps are available. Embodiments of the present invention also efficiently propagate vertex values along graph edges by determining whether to pull or push values based on characteristics of the query, graph, and hardware and/or software performance.

In order to execute techniques discussed above, the system generates many traversal FSMs during the course of executing a query. A traversal FSM is a modified version of a FSM which the system generates for a graph. Such a graph can be any type of graph, including bipartite or general graphs. A bipartite graph is a set of vertices that can be divided into two disjoint sets U and V such that every edge connects and only connects a vertex in U and a vertex in V.

When the system initially receives the graph and query, the system generates a FSM for the query. The system utilizes the FSM to facilitate efficient query execution. A FSM is a model of computation representing the analytics engine executing the query. The FSM is an abstract machine that can be in one of a finite number of states. The FSM includes a set of states, a start state, an input alphabet, and a transition function that maps input symbols and current states to a next state. The FSM is in only one state at a time, which is called the current state. It can change from one state to another when the FSM receives input, which causes the FSM to change from one state to the next. Some of the states in the FSM are traversal steps.

A traversal step is a step in processing a graph query in which the processors follow edges from one or more predecessor vertices to successor vertices to determine the successor vertices. The traversal step involves a subset of vertices of the graph, which are called the frontier vertices. A frontier vertex is a vertex for which the system determines the successor vertex during a traversal step. For example, the system may execute a traversal step to determine the products that a customer has purchased. The system follows an edge from a predecessor vertex representing the customer to a number of successor vertices representing products. As another example, the system may execute a traversal step to determine other customer vertices that are connected to a product vertex, in order to determine which other customers also purchased the same products as a previous customer.

When the system executes the query and encounters a traversal step in the FSM, the system may dynamically generate and analyze traversal FSMs to search for a nearest future traversal step of the current traversal step in the FSM. A traversal FSM is a modified version of the FSM with a transition function augmented by a total ordering function. The system also generates a bitmask to summarize which subranges of vertices include the frontier vertices that the processors must operate on. A bitmask indicates which subranges of vertices include frontier vertices involved in a traversal step, and the system uses the bit mask to skip computations involving non-frontier vertices. With the bitmask, the system can avoid scanning a subrange of vertices for frontier vertices in a traversal step. The system may generate the bitmask for the current traversal step and/or use the bitmask for the nearest future traversal step, which the system uses to speed up computations involving the traversal steps.

In one embodiment, the system may compute a bitmask only for a compatible future traversal step. Traversal steps are compatible if their respective graphs are equal as defined in this disclosure. If there are no compatible future traversal steps, the system can save time by not computing the bitmask. Note that there may also be multiple future traversal steps that are compatible with a current traversal step. For example, an "if-then-else" statement may include multiple compatible future traversal steps. In such cases, the system may use a total ordering function to order the traversal steps and predict branching to one of the traversal steps for generating the bitmask.

Note that the system is extensible and supports both graph-centric primitives and non-graph-centric primitives for manipulating and analyzing the data. A primitive is a command or function to manipulate and/or analyze data. A graph-centric primitive manipulates and/or analyzes graph-related data. Examples of graph-centric primitives include performing a forward traversal step or passing values between different vertices of a graph. A non-graph-centric primitive manipulates and/or analyzes other types of data that may not be related to a graph. Examples of non-graph-centric primitives include initializing a list of degree-of-separation counters or filtering a list.

A problem may arise with the bitmask technique when a query includes non-graph primitives. When the engine executes non-graph-centric primitives between graph-centric primitives (e.g., between traversal steps), the non-graph-centric primitive may invalidate the bitmask. For example, a non-graph-centric primitive may change count values for product purchases that adversely impacts the correctness of a subsequent traversal step relying on a previously generated bitmask. To resolve the issue caused by the non-graph primitives, the system generates traversal FSMs and analyzes associated total orderings to determine whether to cancel the use of a generated bitmask. If the system determines that an incompatible non-graph-primitive occurs before a traversal step, the system cancels the use of the bitmask for the traversal step. Then, the system can scan through the vertices to determine the frontier vertices for the traversal step. This eliminates the possibility of incorrectly executing a traversal step that may result from utilizing potentially incorrect bitmasks. Further details on how an example non-graph-centric primitive can render a bitmask unusable for a future traversal step are provided below.

The system also supports declarative programming. The system may allow users to utilize a declarative programming language to design graph analysis queries. This helps to hide the low-level implementation details from the users, thereby facilitating ease-of-use and user understanding.

The system can also automatically determine whether pulling or pushing vertex values is more efficient for propagating values associated with vertices during the graph traversals, depending on the characteristics of the query, graph, and hardware and/or software performance. Some applications associate vertices of a graph with particular values. For example, the system may associate each vertex of a graph with a degree of separation value indicating how closely connected people are. The system may pull or push these values between vertices of the graph in order to propagate the values throughout the graph. For example, if the vertex for Jane is associated with a degree of separation value of 2, the system may push a degree of separation value of 3 onto Jim, who is a friend of Jane. Depending on the performance characteristics of the computer, and the characteristics of the graph and query, the system may perform one of pull or push traversal step operations more efficiently than the other. The system can determine whether pull or push is more efficient for each query.

Various implementations of the invention include an open framework for a high-performance analytics engine integrating the various features and techniques described herein. Such a framework should integrate the disclosed graph-centric primitives and non-graph-centric primitives, support declarative language for queries, and generate bitmasks for traversal steps. The inventors have implemented such a framework in an analytics engine, balancing scalability, usability, and extensibility, and aspects of this implementation is described in various sections below.

System Architecture

FIG. 1 presents a block diagram illustrating an exemplary architecture of a graph computation system 100 utilizing the techniques disclosed herein, according to an embodiment. System 100 may search and traverse through graphs to facilitate various applications such as collaborative filtering.

In standard systems, system 100 traverses the vertices of a graph by assigning the vertices to processors according to pre-determined static assignments. However, using the techniques disclosed herein, system 100 dynamically divides and assigns ranges of vertices to processors, including computing the bitmasks for future traversal states, thereby improving utilization of available processors.

System 100 may receive queries that are written in a declarative language. It may determine whether to pull or push values associated with vertices for various applications. Further, system 100 may execute dynamic vertex-to-processor mapping to divide up the vertices of a graph into subranges, assign the various subranges to processors, and process the vertices using the respective processors. System 100 may generate bitmasks for current traversal states and/or future traversal states while executing queries.

Graph computation system 100 may include a graph management module 102 installed on a storage device 104 coupled to a server 106. Note that various implementations of the present invention may include any number of servers and storage devices. In various implementations, graph management module 102 may include a graph analytics engine or other components of graph computation system 100 to perform the techniques described herein. System 100 may receive data describing vertices and edges and store such data in storage device 104. System 100 may read the code for graph management module 102 and the data for vertices and edges 108 from storage device 104. System 100 may dynamically divide the vertices and assign the vertices to processors, such as processors 110A-110H, which operate on the assigned vertices. Various inventive aspects of the graph analytics engine are further described below.

Graph Engine

The inventors invented the high-performance graph engine with the following goals in mind:

Speed and efficiency: This is the foremost goal. The most important factors are (1) speed measured by wall-clock time and (2) efficiency measured by the number of edges traversed per wall-clock second per server.

Declarative programming: Users need not write their own functions or procedures to program the engine. This makes the software neutral to the specific programming languages used by the application developer.

Generality and extensibility: Although aimed at graph processing, the engine is versatile enough to accommodate both graph and non-graph computations commonly found in many analytics applications, as well as future extensions beyond its initial set of graph and non-graph primitives.

The engine may also support other features such as fault tolerance and failure recovery. This disclosure focuses on the three goals listed above.

Note that, as defined in this disclosure, a graph G is a set of vertices $v \in V$, and a set of edges $e \in E$, where e is of the form (u, v), if and only if there is a directed edge from vertex u to vertex v in G. In this case, u is the predecessor of v, and v is the successor of u. If G is undirected, then $\forall (u, v) \in E \rightarrow (v, u) \in E$.

Basic Engine Primitives

The engine supports two main classes of analytics primitives. One class is graph-centric, and the other class is non-graph-centric. Graph-centric primitives perform tasks such as loading a graph from disk to random access memory (RAM), performing forward (or backward) traversals along (or against) the edges of a graph, passing values between different vertices (or edges) of a graph, and partitioning a graph. Non-graph-centric primitives perform tasks such as initializing a list of degree-of-separation counters, converting from an integer list into a floating point list, and filtering a list.

Note that the listed primitives are examples and not all possible primitives are listed. Both classes of primitives may include yet additional primitives with different functionality and variety. The discussion below highlights a few example primitives, how one may integrate such primitives into the engine, and how non-graph-centric primitives may cause problems when the engine generates bitmasks for future traversal steps.

One of the most representative graph-centric primitive examples is the graph traversal primitive, which supports several flavors of computation, including (1) reachability with and without duplicate detection, (2) token counting (e.g., passing and accumulating integer values between vertices), and (3) performing arithmetic operations such as computing the minimum, mean, mode, and maximum over a subset of neighbors of a vertex. Other control parameters may include (1) direction of traversal (e.g., along or against the direction of edges), (2) how values or messages are passed between vertices (e.g., push or pull), and (3) a list of traversable edge types (e.g., tracing only family members on one's social graph).

Besides the control parameters, a traversal step also has its own state variables, including a number of maps that associate each vertex with its current values, where a value can represent anything ranging from the degree of separation to the tokens received. A single vertex can have multiple values, as well as attributes. For purposes of this disclosure, values are mutable and attributes are not. The engine may utilize a property graph model in which a vertex or an edge can have 0, 1, or more associated attributes. For added flexibility, it supports both schema-based and schema-less attribute tables. In a schema-based attribute table, all the columns have pre-defined meanings; whereas a schema-less attribute table does not have such a constraint, since it should explicitly store the meaning of an attribute along with its value. Both schema-based and schema-less attribute tables have advantages and disadvantages, and the engine may provide the user the freedom of choosing either one or mixing them in the same analytics application.

One example of a non-graph-centric primitive is a map filter. With a map filter, system 100 resets elements of a map (e.g., current values of vertices) to a user-defined value (e.g., 0) if some user-defined criterion is satisfied. Non-graph-centric primitives like this can be useful for graph-based computation where additional processing is needed after a graph-centric traversal step is completed (e.g., finding people that are between 2 and 4 degrees of separation from the root). The map filter example also illustrates the declarative programming aspect of the engine, which supports pre-defined filter operators such as "=," "<," and ">," similar to their SQL counterparts typically found in the "where" clause. In other words, the user does not need to write a dedicated function that implements the filter logic.

Use Cases

Even with just the above two primitives, one can construct different use cases in which either the speed or the correctness of the engine is at risk of being compromised. Suppose there is a customer-bought-product graph such that an edge (u, v) exists between a customer u and a product v if u bought v. Given an initial seed customer, use case A is to find other customers who have bought a product that was also bought by the seed customer. Use case A involves the following traversal primitives:

1. A customer-to-product traversal step that finds the products bought by the seed customer
2. A product-to-customer traversal step that finds a set of customers who have bought one or more products identified in Step 1.

If one does not need to pay attention to engine performance, then implementing the above 2-step query can be straightforward e.g., just write a declarative query with 2 instances of the traversal primitive. However, since the foremost goal is speed and efficiency, it is not trivial to achieve high performance in a customer-bought-product graph with millions of vertices (e.g., customers and products) and hundreds millions of edges (e.g., purchase records). In Step 1 of the above example, a single customer usually only purchases a small subset of all the products, and therefore it is unlikely that Step 2 needs to start the graph traversal from all the product vertices. Thus, for improved performance, the engine divides up the set of product vertices into P subranges, where P can be the number of processors available or the number of threads to be used in the traversal. For each subrange, system 100 sets a bit flag if and only if there is at least one product bought by the seed customer that falls into the subrange. A reset bit means the corresponding subrange has no frontier vertices on the product-to-customer traversal frontier, and thus it can be safely skipped without affecting the overall computation.

Now suppose there is another use case B, which is similar to A, except that B involves finding customers who have bought a product that was bought at least k times by the seed customer, where k is a user-specified parameter commonly found in collaborative filtering applications. Use case B involves the following three primitive steps:

1. A customer-to-product traversal step that counts the number of times each product was bought by the seed customer
2. A map filter step that resets the count map such that products bought less than k times all get a value of 0
3. A product-to-customer traversal step that finds a set of customers who have bought one or more products with a positive value at the end of Step 2

The two traversal steps that were close to one another in A are now separated by the filter step in B. This is harmless if the engine does not use the bitmasks described in use case A to skip some of the subranges that do not contain product vertices on the product-to-customer traversal frontier. Such an issue is further complicated by the bitmasks being completely transparent to the user, who cannot access, set, or reset internal data structures. The analytics engine utilizes declarative programming which does not expose low-level implementation details to the user.

For some queries, but not all, it is correct to use the same bitmasks in use case B, because the map filter step would only remove product vertices from, instead of adding new ones to, the frontier and thus Step 3 would not mistakenly skip some subranges that should not have been skipped. However, this is not guaranteed to hold in all use cases. For example, Step 2 of B may have a negation step:

2'. A map filter step that resets the count map, e.g., system 100 resets vertices representing products with a positive purchase count to 0 and system 100 sets a value of 1 to all vertices representing products with zero purchases.

In this revised use case B, system 100 should negate the bitmasks to correctly implement the semantics of "finding those customers who have not bought any product bought by the seed customer" as intended by the negation operation in Step 2'. Thus, keeping the same bitmasks would cause the engine to miss everything on the frontier. In general, there can be an arbitrary number (and different types) of steps in between two traversal steps, and thus it would be difficult to guarantee these bitmasks are always consistent with the intended operations, not to mention the difficulty with which to infer the intention of the user based on the query steps.

Experimental results show there is significant value to the use of the bitmasks, which provides improved engine performance. The challenge is how to catch all the cases where the integrity of the computation is at risk, because no speed and efficiency gain can compensate for the loss of correctness.

Dynamic Vertex-to-Processor Mapping

Another challenge is how to divide up the full range of the frontier vertices into P subranges such that the parallel efficiency of the engine can be maximized or at least improved. This is not trivial, for the reasons described below.

First, the best mapping of frontier vertices to processors can depend on the direction of traversal. For graphs with certain structures including bipartite and/or semi-bipartite graphs, the best vertex-to-processor mapping strategy should adapt to the direction of traversal, which renders the best mapping not only a function of the graph but also a function of each traversal instance.

Second, finding vertices on the frontier efficiently requires collaboration between multiple traversal steps. To avoid explicit enumeration of all possible vertices just to find those on the frontier, the engine may utilize hints for a traversal step (e.g., an approximate version of the frontier stored as a bitmask) that the engine computes during a previous traversal step. Note that during the previous traversal step, the engine needs data indicating which future traversal step it is computing the hints for, since different traversal steps may need different hint parameters (e.g., dynamic mapping mentioned in the above paragraph depends on the traversal direction).

Figure 2:
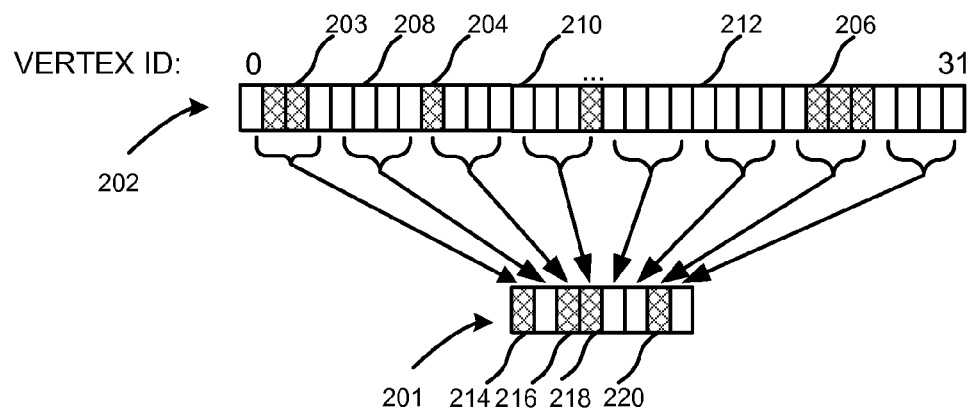
FIG. 2 presents a block diagram illustrating an exemplary 8-bit bitmask that summarizes a current search frontier for a graph with 32 vertices.
Figure 3:
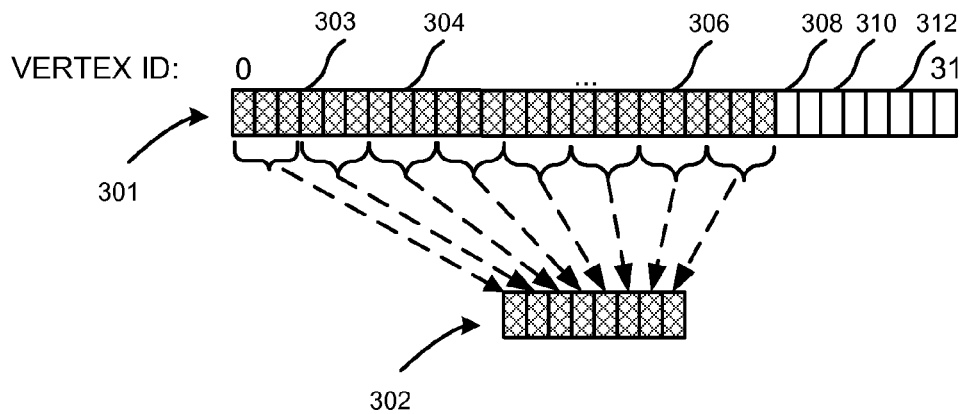
FIG. 3 presents a block diagram illustrating a search frontier and corresponding bitmask for a bipartite graph, according to an embodiment.
Figure 4:
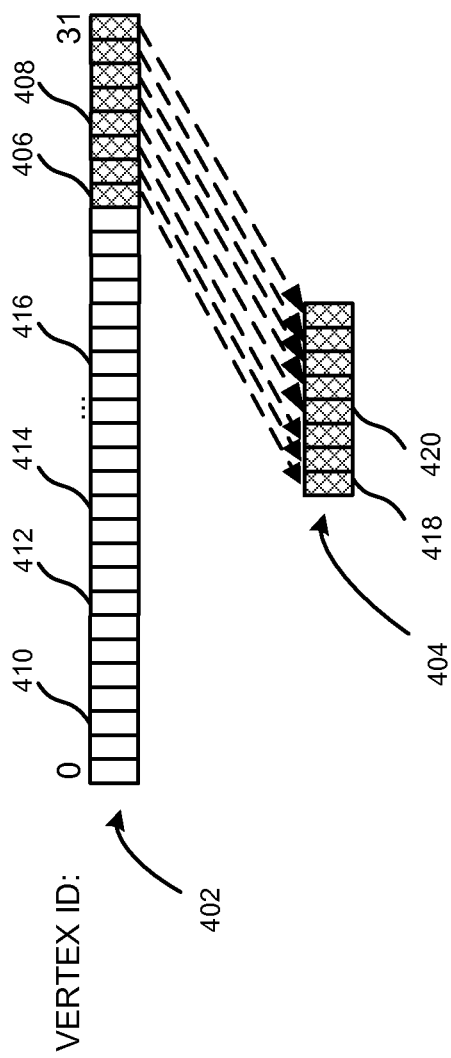
FIG. 4 presents a block diagram illustrating a search frontier and corresponding bitmask for the bipartite graph of FIG. 3, with an opposite traversal direction in which only vertices corresponding to blocks #24~#31 can be on the search frontier, according to an embodiment.

The following examples discussed with respect to FIG. 2, FIG. 3, and FIG. 4 illustrate the issues related to computing bitmask hints for the search frontier. The example of FIG. 2 illustrates the basic concept of frontier hints. A frontier hint is a bitmask that summarizes the presence of frontier vertices (e.g., vertices that need to be processed by the current traversal step), in order to ignore vertex chunks (e.g., consecutively numbered vertices within a range) that are not on the search frontier. FIG. 2 and FIG. 3 illustrate dynamic vertex-to-processor mapping with corresponding bitmasks as frontier hints.

FIG. 2 presents a block diagram illustrating an exemplary 8-bit bitmask 201 that summarizes a current search frontier 202 for a graph with 32 vertices. The vertices are numbered from 0 to 31. Blocks with crosshatching represent vertices on the search frontier. For example, blocks 203, 204, and 206 represent vertices on the search frontier. Empty blocks represent non-frontier vertices. For example, blocks 208, 210, and 212 represent non-frontier vertices. In this example, system 100 sets the $k^{th}$ bit of the bitmask if and only if any of the vertices with an ID∈[4k, 4k+3] is on the search frontier. In these illustrations, the set bits of the bitmask are also depicted with crosshatching. For example, system 100 sets bits 214, 216, 218, and 220 because these bits correspond to vertices on the search frontier. For example, bit 216 corresponds to block 204. If these bits correspond to 8 processors numbered from 0 to 7, each responsible for processing 4 vertices with consecutive IDs, then the $k^{th}$ processor has no vertices to process unless the $k^{th}$ bit of the bitmask is set. In this example, only processors 0, 2, 3, 6 are busy, since their corresponding bits 214, 216, 218, and 220 are set in the bitmask. The rest of the processors are provably idle, and thus can be safely ignored.

FIG. 2 illustrates a standard technique to skip non-frontier vertices without enumerating a whole set of vertices. If the mapping from vertices to processors is fixed (e.g., static vertex-to-processor mapping), system 100 can compute frontier hints without information regarding future traversal steps, as long as all steps operate on the same graph. However, when system 100 applies dynamic vertex-to-processor mapping, system 100 can compute frontier hints only if information regarding the traversal step for which these hints are computed is available upfront, because different traversal steps require different parameters for the frontier hints. The following two examples of FIG. 3 and FIG. 4 explain dynamic mapping in greater detail.

FIG. 3 presents a block diagram illustrating a search frontier 301 and corresponding bitmask 302 for a bipartite graph, according to an embodiment. In FIG. 3, only vertices corresponding to blocks #0 to #23 can be on the search frontier in a current traversal direction. Vertices corresponding to blocks #24 to #31 are depicted as empty blocks because they are not in the search frontier. For example, blocks 303, 304, and 306 represent vertices that may be in the search frontier. Blocks 308, 310 and 312 represent blocks that cannot be in the search frontier for the respective traversal direction. The cross-hatching on bits in bitmask 302 show that all processors will process vertices 0 to 23, with each processor assigned to three vertices. Since there are 8 processors and only the first 24 vertices are eligible to be on the search frontier, an optimal strategy is to assign processor p with three (instead of four in the previous example) vertices with IDs in the range of [3p, 3p+3), which is different from the following case illustrated in FIG. 4.

FIG. 4 presents a block diagram illustrating a search frontier 402 and corresponding bitmask 404 for the bipartite graph of FIG. 3, with an opposite traversal direction in which only vertices corresponding to blocks #24 to #31 can be on the search frontier, according to an embodiment. Vertices corresponding to blocks #0~#23 are represented as empty blocks because they are not in the search frontier. For example, blocks 406 and 408 represent vertices that may be in the search frontier. Blocks 410, 412, 414, and 416 represent vertices that cannot be in the search frontier for the associated traversal direction. The cross-hatching on bits in bitmask 404 show that all processors will process vertices, with each processor assigned to one of the vertices corresponding to blocks #24 to #31. With 8 processors and only the last 8 vertices being eligible for traversal, an optimal strategy is to assign processor p with a single (instead of three in the previous example) vertex with an ID of 24+p, which is different from the strategy used in the previous example.

System 100 should compute frontier hints before executing the traversal step that consumes them. Depending on the traversal step consuming these hints, system 100 should set the hint bit for processor p, if $\lfloor ID(v)/3 \rfloor == p$, for the traversal step in FIG. 3

$ID(v)-24 == p$, for the traversal step in FIG. 4 where v is a vertex added to the frontier by the previous traversal step, and ID(v) is a function that returns the integer ID of vertex v. Note that system 100 may not compute such hints without knowing which traversal step the hints are being computed for. Further, these hints are only for dynamic vertex-to-processor mapping, because system 100 can perform static mapping using the same static test condition "$\lfloor ID(v)/4 \rfloor == p$" to set the hint bit for processor p in the cases of both FIG. 3 and FIG. 4, regardless of the traversal direction.

System 100 may determine which hint bits to set according to the following equation. Let $V_{src}$ be the set of source vertices (e.g., those with at least one successor) of the traversal step for which system 100 is computing the frontier hints. Let $v_{min-src}$ and $v_{max-src}$ be the minimum and maximum integer identifiers of $V_{src}$, respectively. Let P be the number of processors (or threads) to be used in the traversal step consuming (as opposed to computing) the hints. Let $n = \lfloor (v_{max-src} - v_{min-src} + 1)/P \rfloor$ be the average number of vertices assigned to a single processor. When system 100 adds a new vertex v to the frontier by a previous traversal step, system 100 should set the hint bit for processor p, if $$\lfloor (ID(v) - v_{min-src})/n \rfloor == p \quad \text{(Equation 1)}$$

One can verify that the formula above holds true for both FIG. 3 and FIG. 4, as follows:

FIG. 3: $v_{min-src}=0$, $v_{max-src}=23 \rightarrow n=24/8=3 \rightarrow \lfloor ID(v)/3 \rfloor == p$ FIG. 4: $v_{min-src}=24$, $v_{max-src}=31 \rightarrow n=8/8=1 \rightarrow ID(v)-24 == p$ As can be seen above, FIG. 3 and FIG. 4 differ in $v_{min-src}$ and $v_{max-src}$, which give rise to different test conditions for setting the hint bits for the processors. Once system 100 determines parameters such as $v_{min-src}$, $v_{max-src}$ and P, system 100 has also determined the formula with which to compute the hint bits. The question is how to determine the values of these parameters for a traversal step that has not yet occurred, since the traversal step computing the hints always takes place before the step consumes the same hints. This requires knowledge of the future, and has motivated the design of a programmable graph analytics engine, which can be viewed as a FSM as described below.

FSM View of a Graph Engine Query:

Programmability is a key feature that differentiates the disclosed graph engine from other domain-specific alternatives that are less general. While there are several ways to illustrate the programming aspects of the disclosed engine, this disclosure presents the FSM view, because it lends itself naturally to the solutions proposed below. To illustrate the concept, the following is an example of a simple FSM, which describes the basic breadth-first search query.

Figure 5:
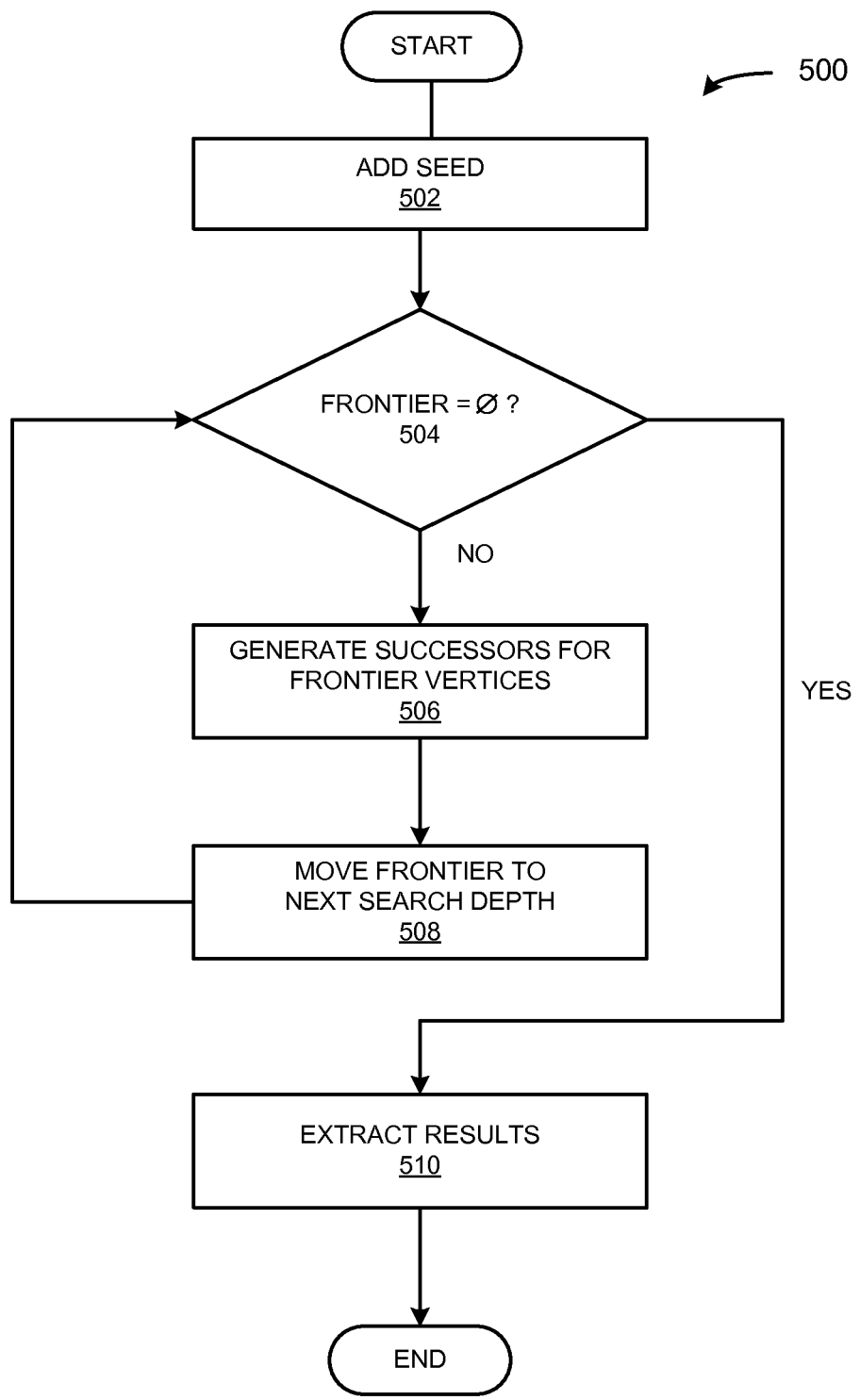
FIG. 5 illustrates an exemplary breadth-first search query expressed in terms of the states and transitions of a FSM, according to an embodiment.

FIG. 5 illustrates an exemplary breadth-first search query expressed in terms of the states and transitions of a FSM, according to an embodiment. System 100 executes the query according to the states of the FSM. Each state of the FSM corresponds to an operation performed by system 100. During operation, system 100 initially adds a seed vertex (operation 502). If the frontier is not null (operation 504), system 100 generates successors for frontier vertices (operation 506). Next, system 100 moves the frontier to the next search depth (operation 508), and repeats the process from operation 504. If the frontier is null at operation 504, the system will then extract results for the query (operation 510).

For basic expressivity, this disclosure assumes such FSMs support one or more programming features such as:
  One unique starting state
  Branching, which is equivalent to if-then-else statements in conventional programming languages
  Conditional looping, which is equivalent to while-loop or for-loop statements
  Unconditional state transition, which is equivalent to go-to statements
  One or more halting states The analytics engine should support both graph-centric and non-graph-centric computations. This disclosure does not limit the specific computations of either kind that should be supported by the engine, although the absence of non-graph-centric computations would simplify the design of the engine. Nevertheless, this disclosure assumes both types of computations (e.g., graph-centric or non-graph-centric) may co-exist in the same engine, for the interest of generality.

One can use FSMs to describe various graph search techniques. Moreover, this disclosure describes how system 100 may leverage the FSM formalism to automatically compute the search frontier hint bits in a robust and domain-independent way.

The main advantage of viewing programs running inside of the engine as FSMs is that, in addition to the current program state, the engine can also access possible future states. The engine can subsequently apply branch prediction, loop unwinding, state transition, and other program analysis techniques to determine the best ways to compute the frontier hints for the next traversal step. In events such as a branch misprediction (e.g., if-then-else branch statements), the engine can recover gracefully without risking the integrity of the computation.

Formally, a finite-state machine M is a 5-tuple $(Q, \Sigma, \delta, q_0, F)$, where Q is a finite set of states, $\Sigma$ is a finite set of input symbols called the alphabet, $\delta: Q \times \Sigma \rightarrow Q$ is a deterministic state transition function, $q_0$ is the starting state, and $F \subseteq Q$ is a finite set of halting states. In the context of the graph engine, $\Sigma$ is the graph(s) being processed by the engine. To differentiate states that perform graph-traversal computations from those states that do not, this disclosure defines a set of graph traversal states $Q_g \subseteq Q$ for which system 100 needs to compute the search frontier hints. Also, there is a set of anti-traversal states $Q_{-g} \subseteq Q$ for which system 100 should reinitialize search frontier hints (e.g., in order to turn on all processors) for computation correctness. Note that $Q_g \cap F = \emptyset$ (e.g., halting states are non-traversal), $Q_g \cap Q_{-g} = \emptyset$ and $Q_g \cup Q_{-g} \subseteq Q$ (e.g., control states such as branching states are neither in $Q_g$ nor in $Q_{-g}$). For a state $q \in Q$, system 100 may construct (e.g., possibly dynamically) a modified FSM $M_q = (Q, \Sigma, \delta_\tau, q, F_{-g})$, called a traversal FSM, where Q and $\Sigma$ are the same as in M, the original FSM $\delta_\tau: Q \times \Sigma \rightarrow Q$ is a modified state transition function, which contains all the transitions $\in \delta$ augmented with a strict total order function $\tau$ such that multiple transitions originating from the same state, e.g., a conditional-jump state q with both a "then" successor $q_{then}$ and an "else" successor $q_{else}$, can be deterministically enumerated according to function $\tau$, e.g., $\tau: \delta(q \rightarrow q_{then}) < \delta(q \rightarrow q_{else})$ implies the multi-successor state q will generate $q_{then}$ as its first successor state before it generates $q_{else}$ as the next successor state.

q is the starting state of $M_q$ $F_{-g} = F \cup Q_{-g}$ is the set of halting states Let $\delta_\tau(q)$ be the successor enumeration function that generates the successor states of q in the order that is consistent with the strict total order function $\tau$. For notational simplicity, statements such as "for each $q' \in \delta_\tau(q)$ do" indicate such enumerations. Let find-compatible-traversal-state be a function defined as follows:

function find-compatible-traversal-state(M, s, q)
Input: M, graph engine query as a FSM;
  s, the traversal state for which to find a compatible traversal state
  q, the current FSM state whose successor states are to be enumerated
Output: a traversal state that is compatible with state s, or $\perp$ if none exists 1. $(Q, \Sigma, \delta_\tau, q, F_{-g}) \leftarrow$ make-traversal-FSM(M, q)/*as $M_q$ defined previously*/
2. for each $q' \in \delta_\tau(q) \wedge q' \notin F_{-g}$ do
   a. if $q' \in Q_g \wedge$ compatible(s, q') then return q'
   b. else if $q' \notin Q_g$ then return find-compatible-traversal-state(M, s, q')
3. return $\perp$ When the engine encounters a traversal state $s \in Q_g$ that has not been executed, the engine initiates a (e.g., recursive) function call to find-compatible-traversal-state with (M, s, s) as its initial parameters to search for the nearest traversal state to be executed in the future that is compatible with s. There is no need to start a sequence of calls to find-compatible-traversal-state if $s \notin Q_g$, although find-compatible-traversal-state may visit a non-traversal state during the call sequence (e.g., as the third parameter q). Note that system 100 does not enumerate successor states of an anti-traversal state $\in Q_{-g}$, because any such state would invalidate the frontier hints computed, even if there is a compatible traversal state to be executed later. Thus, the basic idea behind find-compatible-traversal-state is to find the next traversal step compatible with the current one without passing through any anti-traversal state.

The purpose of the strict total order function τ is to break ties when system 100 finds two or more traversal states compatible with the same traversal state, but they do not have the same $v_{min-src}$ and $v_{max-src}$ needed by Equation 1 to compute the frontier hints. This is illustrated using the previous if-then-else example states. Suppose states a, b, and c correspond to traversals shown in FIG. 2, FIG. 3, and FIG. 4. While a is compatible with either b or c, b and c do not share the same $v_{min-src}$ and $v_{max-src}$. Thus, one needs a tie breaker to pick a winner between b and c such that the frontier hints can be computed with a single set of parameters. Note that in the actual execution of the FSM, such a tie-breaker function τ might not be used, because for any deterministic input $\in \Sigma^*$ the behavior of the FSM is also deterministic. The reason find-compatible-traversal-state uses τ is to avoid the expensive computation just to determine the set of future states a query could be in. This way, the graph engine can perform forward reachability analysis and traversal compatibility test in the FSM without excessive computation overhead.

The tie breaker is not perfect, and there is always a chance the engine picks up the wrong traversal state to compute the frontier hints for, although it has been rare in past experience. But when a misprediction occurs, the engine will immediately catch it, because system 100 stamps every set of computed hints with the respective traversal state for which the hints are computed. If the wrong traversal state ends up being executed, then the engine will automatically detect the mismatch and subsequently discard these hints as if they were never computed. Instead, the engine will perform a full scan of the vertices to find those on the current search frontier. This way, the integrity of the computation is never at risk.

Alternatively, system 100 may keep multiple versions of the frontier hints, one for each possible future traversal state that is compatible with the current one. A potential drawback is the added overhead in computing and maintaining multiple versions of frontier hints, even though system 100 will use only one version and discard the rest. The benefit is avoiding a full scan of the vertices in all possible cases, unless system 100 encounters an anti-traversal step, which forces system 100 to reinitialize all hint bits (e.g., set all bit flags to 1). Regardless of whether it is better to use single or multiple versions of frontier hints, the concept of finding only the compatible traversal step(s) is always useful, since system 100 can avoid the overhead of computing these hints altogether if there is no such step(s) that can profit from frontier hints in the future. Thus, system 100 would not compute the frontier hints during the current traversal s, if function find-compatible-traversal-state(M, s, s) returns ⊥, e.g., there is no future traversal state that is compatible with s.

In function find-compatible-traversal-state, system 100 uses a helper function compatible to test the compatibility of two graph traversal states. Because system 100 can test only graph traversal states for compatibility, it is safe to assume that the engine may access graph G that is processed by the traversal state s. This disclosure uses the notation "s.G" to denote the graph associated with state s. One implementation of function compatible is as follows:

function compatible(s, q)
        Input: s and q, two traversal states the compatibility of which is to be tested
        Output: true if s is compatible with q; false otherwise
        1. if s.G≠q.G then return false
        2. return true The Boolean function above is only conceptually simple, because testing if two traversals operate on the same graph G may not be trivial in practice. For efficiency reasons, this disclosure does not classify non-trivially isomorphic graphs as being equal. In this disclosure, two graphs are equal, if and only if they both:

1. Have the same graph partitions (more below), and
2. Have the same set of vertices with exactly the same mapping from vertices to vertex IDs, and
3. Have the same set of edges
    with exactly the same mapping from edges to edge IDs, or
    representing the same connections between vertices, if edges do not have explicit IDs The above requirements make it computationally tractable to test for the equality (or inequality) of two graphs. For number 3 of the graph equality definition above, one can distinguish between two cases, e.g., graphs with explicitly assigned edge IDs and those without. One common way of representing an edge e connecting two vertices u and v is simply "(u, v)" without an explicit edge ID assigned to e. In such a case, there is no way to make sure the internal edge ID assigned to e by the graph engine, if any, is the same between the two graphs being tested for equality. This can happen when an undirected graph is represented as two directed graphs G and G' such that $\forall (u, v) \in E \to (v, u) \in E'$ and $\forall (u, v) \in E' \to (v, u) \in E$, because an edge in one direction can be assigned an internal edge ID (e.g., an edge sequence number or a pointer) that is different from the same edge encoded in the opposite direction. The graph equality definition above accommodates such cases, and considers two traversals operating on the same graph but in opposite directions as being compatible with one another.

According to the above definition, if two graphs are equal, then there is really no benefit of having two separate encodings of the same graph, other than for the purpose of performing efficient traversals in both directions. Thus, rather than checking for identical vertices and edges one by one, system 100 may allow the user to specify two directed graphs that encode a single undirected (or directed) graph. This way, all the engine needs to check is to see if pointers to these graphs are either identical (e.g., they are just referring to the same graph) or duals (e.g., they are directed versions of the same graph). The complexity of such equality checks is O(1), since it doesn't depend on the size of the graph. To prevent misuse, system 100 may require that for two directed graphs G and G' to be considered as duals under the same undirected graph, their $v_{min-src}$ and $v_{max-src}$ statistics are duals as follows:

$$v_{min-src} = v'_{min-dest} \wedge v'_{min-src} = v_{min-dest}$$

$$v_{max-src} = v'_{max-dest} \wedge v'_{max-src} = v_{max-dest}$$

where $v_{min-dest}(v'_{min-dest})$ and $v_{max-dest}(v'_{max-dest})$ are minimum and maximum integer identifiers of the destination vertices (e.g., those with at least one predecessor) of graph G (G').

For both directed and undirected graphs, each traversal direction of the same graph can have up to two encodings; one sorted on the source vertex IDs and the other sorted on the destination vertex IDs. Because the predecessors of a vertex in one encoding can be seen as its successors in the opposite encoding, system 100 can use the duality checking formula described above to detect mismatches between different encodings of the same directed or undirected graph.

Passing Values Between Vertices

In most analytics applications, the purpose of graph traversals is to propagate information between vertices along the edges of a graph. System 100 can associate a vertex with a set of values, which can represent anything such as the degree of separation or the number of tokens received. System 100 offers two ways of passing these values (e.g., message passing) in parallel between vertices, which are push and pull. In a value push, the value sender notifies the receiver on an as-needed basis. In a value pull, the receiver inquires all of its possible senders for potential updates, regardless of whether the sender has a value update or not.

Whether it is better to push or pull values depends on the ratio between the number of edges traversed by push and the total number of edges along the same direction as the values are being passed. Such a ratio falls into the range between 0 and 1. If the ratio is close to 0, then system 100 should choose push over pull. System 100 should choose pull over push if the ratio is close to 1.

The reason is that push has higher overhead per edge traversed than pull, because doing value push requires sequential reads (e.g., scan the values of frontier vertices in order) but random writes (e.g., system 100 may need to push the value of a frontier vertex to its successors that are more or less randomly distributed); whereas doing value pull requires random reads (e.g., inquire all predecessors of a vertex to see if its value needs updating) but sequential writes (e.g., system 100 updates and writes the values to the vertices in linear order). Due to the asymmetric performance implications of random reads and writes, modern computer architectures usually favor random reads with sequential writes over sequential reads with random writes, if the combined total of reads and writes is the same.

Let $R_{seq}$ and $R_{rand}$ be the average sequential and random read times, respectively. Let $W_{seq}$ and $W_{rand}$ be the average sequential and random write times, respectively. System 100 can estimate runtime of push and pull using the following formula:

$$t_{push}: |V_s|*R_{seq}+|E_s|*W_{rand}$$

$$t_{pull}: |V_r|*W_{seq}+|E_r|*R_{rand}$$

where $V_s$ is the set of sender vertices that initiate the value pushes, $E_s$ is the set of sending edges along which the value pushes travel, $V_r$ is the set of receiver vertices that need to update their values, and $E_r$ is the set of receiving edges along which the value pulls travel. Under most circumstances, the following inequalities hold:

$$R_{seq}<W_{seq}<R_{rand}<W_{rand}$$

$$|V_s|\leq |V|$$

$$|E_s|<<|E|$$

$$|V_r|\leq |V|<<|E_r|\approx |E|$$

One can simplify the runtime estimates for push and pull as follows:

$$t_{push}: |V_s|*R_{seq}+|E_s|*W_{rand}\approx |V|*R_{seq}+|E_s|*W_{rand}\approx |E_s|*W_{rand}$$

$$t_{pull}: |V_r|*W_{seq}+|E_r|*R_{rand}\approx |V|*W_{seq}+|E|*R_{rand}\approx |E|*R_{rand}$$

That is, one can simplify both formulae above to keep only the dominating terms, which are $|E_s|*W_{rand}$ for $t_{push}$ and $|E|*R_{rand}$ for $t_{pull}$. Let $\alpha=|E_s|/|E|$ and $\beta=W_{rand}/R_{rand}$. Note that $\alpha\leq 1$ and $\beta\geq 1$. Then the ratio between $t_{push}$ and $t_{pull}$ becomes:

$$t_{push}/t_{pull}\approx (|E_s|*W_{rand})/(|E|*R_{rand})=\alpha\cdot\beta$$

That is, push is faster than pull when $\alpha\cdot\beta<1$. If $\alpha\cdot\beta>1$, then pull is faster than push. For example, if a random read is twice as fast as a random write (e.g., ($\beta=2$), then push is faster than pull if less than 50% of the edges need to be traversed to accomplish push; otherwise pull is faster. On the other hand, if a random read is only 50% faster than a random write (e.g., ($\beta=1.5$), then push is faster if it only needs to traverse less than two thirds (67%) of the edges.

The inventors conducted experiments to measure $\beta$ on a test machine, which has an Intel Xeon E3-1225 3.1 GHz processor with 4 cores and 8 GB of RAM. The inventors recorded the wall-clock seconds to perform 200 million random reads or writes. The results are random reads took 7.89 seconds and random writes took 8.39 seconds. To account for the overhead of the random number generator, the inventors measured the speed of generating 200 million random numbers without any reads or writes (other than the ones needed by the random number generator, of course), which took 2.05 seconds. Subtracting the same 2.05 seconds from both gives 5.84 seconds for pure random reads and 6.34 seconds for pure random writes. Thus, $\beta=W_{rand}/R_{rand}=6.34/5.84=1.086$, which means as long as $\alpha\leq 92\%$, i.e., push needs to traverse less than 92% of all the edges, it is better for system 100 to use push rather than pull.

Figure 6:
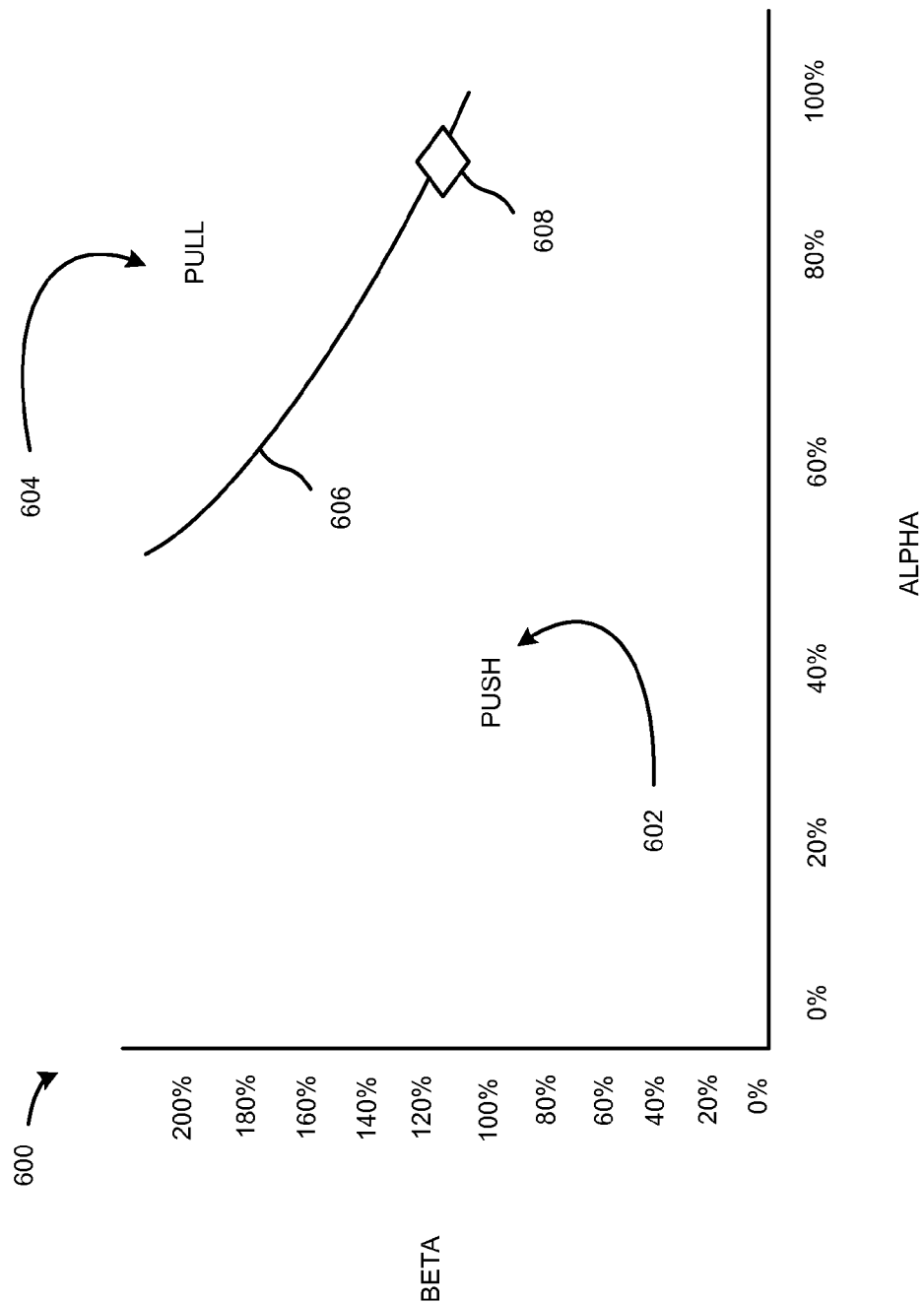
FIG. 6 presents a graph illustrating α-β regions in which the system should choose either push or pull, according to an embodiment.

FIG. 6 presents a graph 600 illustrating $\alpha$-$\beta$ regions in which system 100 should choose either push or pull, according to an embodiment. FIG. 6 shows two disjoint regions 602, 604 in the space of $\alpha$ and $\beta$ where either system 100 should choose push over pull or the other way around. The break-even points between push and pull fall on a curve 606 (e.g., the indifference curve) where neither has a speed advantage over the other. The break-even point for the test machine is highlighted with a diamond shape 608 on curve 606.

Because $\beta$ is a constant that depends only on the machine (e.g., ($\beta=W_{rand}/R_{rand}$) and one can measure $\beta$ with reasonable accuracy, the remaining challenge to decide whether it is better to use push or pull is how to estimate $\alpha$, which depends on the graph and the query. Predicting the exact value of $\alpha$ before the value push step starts can be difficult, since the exact number of edges traversed is unknown until the step is completed. However, assuming that the number of edges traversed is proportional to the number of vertices on the search frontier, then system 100 can estimate $\alpha$ as $|Vs|/|V|$, the ratio between the number of sender vertices and the total number of vertices. Note that the estimation of a just needs to be accurate enough to determine if $\alpha\cdot\beta$ is less than 1 or not. For example, a test machine (with ($\beta=1.086$) only needs to determine if $\alpha<92\%$, while $\alpha\leq 100\%$ is always true.

There are cases where the entire set of vertices is on the search frontier, and this makes pull better than push. For example, global graph clustering usually iterates over the full set of vertices, which leads to $\alpha=1$ and $\alpha\cdot\beta\geq 1$, since $\beta\geq 1$. In those cases, one can hardcode the choice of pull over push into the query without the need to estimate $\alpha$. In other cases (e.g., local clustering), however, it is probably better to always use push, although choosing push over pull based on the values of $\alpha$ and $\beta$ is more principled.

Unlike push, pull requires system 100 to propagate the values against the direction of traversal, e.g., from vertices to their predecessors rather than successors. A single traversal direction of the same graph can have up to two encodings. One encoding is sorted on the source vertex IDs and the other encoding is sorted on the destination vertex IDs. Since the predecessors of a vertex in one encoding can be seen as its successors in the opposite encoding, the engine may automatically choose the inverted graph encoding to implement the pull semantics. As a result, a frontier vertex for pull means the frontier vertex's values need updates, whereas for push it means system 100 should use the values of the vertex to update other vertices. Because the semantics of frontier vertices are different between push and pull, one should not mix their frontier hints with one another. Thus, an implementation of function compatible should not only test for graph equality, but also test for the compatibility of the value-passing methods being used, such that a push traversal is only compatible with another push traversal, and a pull traversal is only compatible with another pull traversal. Because mixing push and push in the same query is uncommon, this rarely affects the efficiency of the engine. Let value-passing-method(s) be a function that returns either push or pull for a graph traversal state s. Below is the pseudocode for the new version of function compatible just described and a flowchart in FIG. 7 illustrating an exemplary process for determining whether to pull or push vertex values.

function compatible(s, q)

Input: s and q, two traversal states the compatibility of which is to be tested

Figure 7:
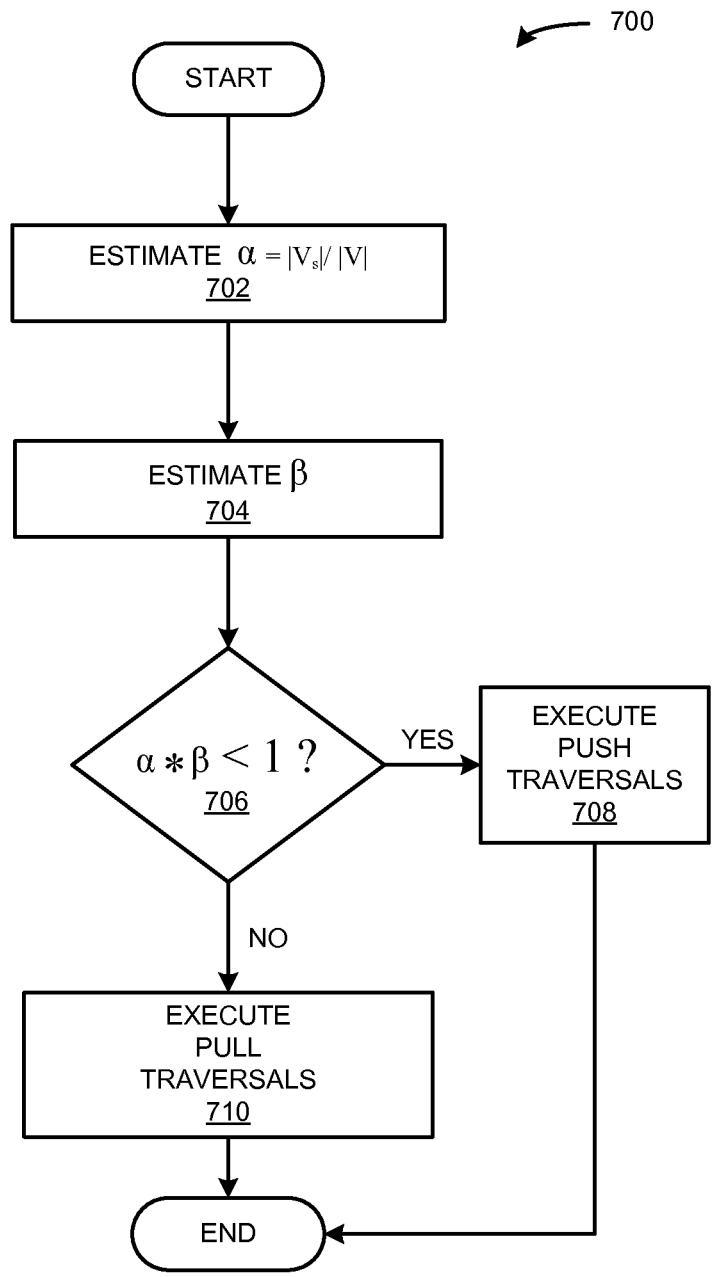
FIG. 7 presents a flowchart illustrating an exemplary process for determining whether to pull or push values associated with vertices for a given query, according to an embodiment.

Output: true ifs is compatible with q; false otherwise 1. if s.G≠q.G then return false 2. if value-passing-method(s)≠value-passing-method(q) then return false 3. return true FIG. 7 presents a flowchart illustrating an exemplary process for determining whether to pull or push values associated with vertices for a given query, according to an embodiment. During operation, system 100 initially estimates a value for $\alpha$ according to the equation $\alpha=|V_s|/|V|$ (operation 702). Note that the parameters for determining a depend on the sender vertices and the total number of vertices. This value of $\alpha$ is an approximation that assumes the number of edges traversed is proportional to the number of vertices on the search frontier.

Next, system 100 estimates a value for $\beta$ according to the equation $\beta=W_{rand}/R_{rand}$ (operation 704). Note that the value of $\beta$ is dependent only on the characteristics of the computer's performance parameters. System 100 then determines whether $\alpha*\beta<1$ (operation 706). If $\alpha*\beta<1$, then system 100 pushes the vertex values (operation 708). Otherwise, system 100 pulls the vertex values (operation 710). Note that some embodiments may apply push/pull techniques differently. For example, some embodiments may mix push and pull in the same query, although this is uncommon.

Traversals with One or More Graph Partitions

For parallel processing, pull has an advantage over push because pull is easier to parallelize. Pull reads randomly and writes sequentially, and push reads sequentially and writes randomly. It is easy for system 100 to control where pull writes and where push reads, whereas controlling where pull reads and where push writes is more difficult. But since multiple processors can always read from but not write to the same memory cells concurrently, it is more important to have non-overlapping write regions than non-overlapping read regions for parallel processing. As a result, system 100 can more easily parallelize pull, whereas push requires more sophisticated approaches. Because pulling values in parallel is easy, this disclosure focuses on the more difficult problem of how to push values in parallel next.

To allow parallel pushes, system 100 may encode a graph in multiple partitions, such that each partition contains only those edges that end with a subset of the destination vertices. To ensure universal applicability, there is no constraint on the set of source vertices from which the edges of each partition can start. Such a partitioned encoding ensures that multiple processors can never accidentally push values to the same destination vertices, which are guaranteed to be disjoint from one partition to another. But because the source vertices are unconstrained, it means each processor may need to potentially enumerate the full set of source vertices to ensure all values are pushed properly to their destinations, although in certain cases the processors need to push only a subset of the source vertices in each partition.

The number of processors system 100 uses in a parallel push step should not exceed the number of graph partitions, in order to avoid excessive synchronization or communication overhead. In one example implementation, the engine assigns the same number of processors as there are graph partitions for maximum speed-ups. For other parallel processing steps such as non-graph-centric primitives, however, since multiple processors can work on a single partition without synchronization, it is not only possible but also practically beneficial to use more processors than there are graph partitions. Primitives like push with maximum concurrency constrained by the number of graph partitions are partition-bounded primitives, and unconstrained primitives are referred to as partition-unbounded primitives.

To allow a single query to contain both partition-bounded and partition-unbounded primitives, the engine may require each primitive to state whether it is a partition-bounded primitive or not. If the primitive is partition-bounded, then each processor is responsible for processing the range of vertices $\in[v^p_{min-src}, v^p_{max-src}]$, where $v^p_{min-src}$ and $v^p_{max-src}$ are the minimum and maximum integer identifiers of the source vertices in graph partition p. If it is a partition-unbounded primitive, then system 100 may assign the vertices to processors according to Equation 1. In some implementations, for a graph with multiple partitions, system 100 can apply Equation 1 to each of its partitions, and subsequently perform a partition-unbounded primitive step using multiple processors per partition. Thus, the number of graph partitions does not limit the maximum number of processors that can be used in any partition-unbounded primitives. Furthermore, since the engine may use a graph partitioning algorithm that is guaranteed to find P partitions, where P can be as large as the number of available processors, the worst-case scenario in which the graph has no native partitions is also covered. For details of the graph partitioning algorithm, please refer to related U.S. patent application Ser. No. 13/932,377 (entitled "System and Method for Parallel Search on Explicitly Represented Graphs," by inventor Rong Zhou, filed 1 Jul. 2013).

Accommodating New Primitives

In some implementations, one can add additional graph-centric and/or non-graph-centric analytics primitives to the engine. The generality of the FSM programming model facilitates accommodating new primitives. The engine is open and extensible, and may require the following information to add a new primitive:

1. Name of the new primitive and its input/output arguments

2. Function that implements the computation for the primitive where the engine specifies the start and end vertices. All such functions should be thread-safe. The engine provides global and local mutex or conditional variables to facilitate the synchronization of different threads (or computer nodes).

3. Whether any pre-processing or post-processing computation is required. If so, supply the corresponding functions that implement such computations.
4. Is it a graph traversal primitive (e.g., is it a member of $Q_g$)? If so, provide a function that takes as input the traversal step to be processed and returns the relevant traversal-step information such as the graph(s) to be traversed, the number of graph partitions, direction of traversal, the type of traversal (e.g., partition-bounded or partition-unbounded) and method of value passing (e.g., push or pull).
5. Is it an anti-traversal primitive (e.g., is it a member of $Q_{-g}$)?

In one embodiment, to simplify the implementation of new primitives while preserving correctness of computation, the default primitive type is one that is anti-traversal and partition-unbounded, unless the user specifies otherwise. This helps users who may not fully understand the implications of traversal or partition-bounded primitives. If system 100 and/or user mistakenly treats a graph traversal step as an anti-traversal step, system 100 still computes the correct answer, albeit at the cost of reduced computation efficiency. This is because the engine always reinitializes the frontier hints for anti-traversal steps. Thus, mistreating traversal steps as anti-traversal steps can only invalidate frontier hints that are otherwise valid, but never compromise the integrity of the computation.

Note that adding new primitives is mainly for advanced users, since the set of graph engine primitives in an implementation should be flexible enough to cover a wide variety of graph algorithms and analytics applications. Adding a single new or few primitives is unlikely to dramatically increase the expressivity of the engine. However, adding new primitives may improve the speed further by combining a few related (e.g., co-occurring) primitives into a single "super step" primitive to further reduce engine overhead. Besides providing the basic glue that binds multiple primitive steps together, one implementation of the core engine also offers a uniform error checking, reporting, and recovery mechanism to improve the robustness of the software. For example, if system 100 determines that the number of graph partitions is different in different traversal directions of the same graph, then the engine can automatically generate an error message to flag such a discrepancy. Experience indicates rigorous error checking is critical to ensuring the proper use of both the engine and the declarative query language.

Exemplary FSM for a Graph-Based Collaborative Filter

Figure 8:
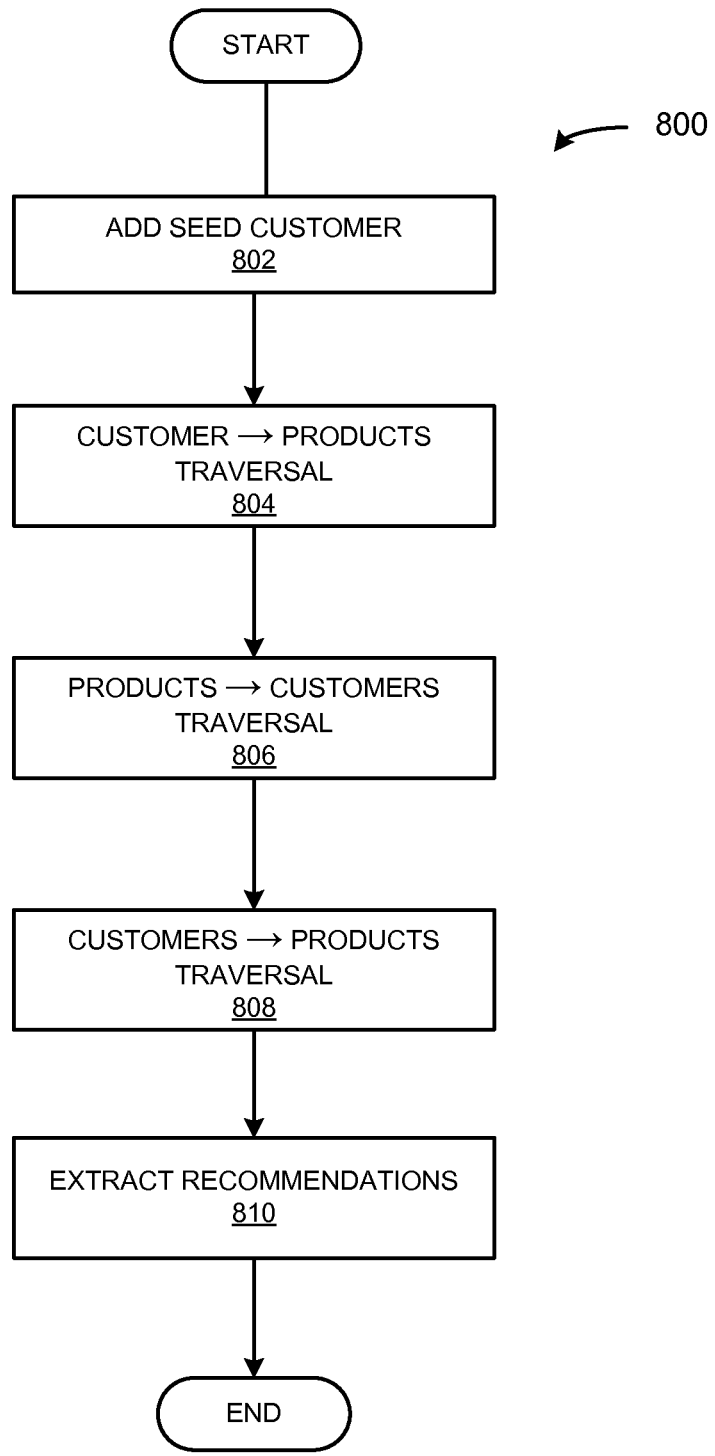
FIG. 8 presents a diagram illustrating an exemplary FSM for a graph-based collaborative filter, according to an embodiment.

FIG. 8 presents a diagram illustrating an exemplary FSM for a graph-based collaborative filter, according to an embodiment. Each state of the FSM corresponds to an operation performed by the system. During operation, system 100 initially adds a seed customer (operation 802). System 100 may then execute a customer to products traversal (operation 804). This is illustrated as "customer→products traversal." After determining the products that the customer has purchased, the system may execute a products to customers traversal (operation 806). This determines the other customers that have purchased products previously purchased by the seed customer, and is illustrated as "products→customers traversal." Next, the system executes a customer to products traversal to determine product purchased by the other customers (operation 808). This is illustrated as "customers→products" traversal. Finally, the system extracts recommendations by examining the purchase data associated with the other customers (operation 810).

FIG. 8 illustrates a collaborative filter query that the inventors used as a benchmark for experiments. To evaluate the graph analytics engine, the inventors conducted experiments using a real-world dataset from the retail business. The experiment used a graph based on customer purchase data of the form <customer_id> <product_id>, where a product with <product_id> is purchased by a customer with <customer_id>.

The most computationally expensive part of the query is the three traversal steps shown in the middle of FIG. 8. While these three steps do not have to be considered as a whole, experiments indicate that performance can be significantly improved if they are. In particular, system 100 can use the frontier hints that are computed in previous traversals to significantly speed up the later traversals, which also tend to be the more expensive steps of the query (as more customers are reached by the traversal steps). Note that the three traversal steps in FIG. 8 are all compatible with one another, based on function find-compatible-traversal-state and function compatible.

The customer→products traversal is compatible with its immediate next step, product→customers traversal, because they are not separated by any anti-traversal steps (as checked by find-compatible-traversal-state) and both operate on the same customer-bought-product graph (as checked by compatible), as long as they both use the same value-passing method.

The product→customers traversal is compatible with its immediate next step, customers→products traversal, for the same reason stated above.

The customers→products traversal is not compatible with any subsequent traversals, since it is the last traversal step. Thus, the engine does not even need to compute the frontier hints, which can save time as well.

Besides demonstrating the efficiency gains achieved by the frontier hints, the inventors chose the collaborative filter query because it contains some non-graph-centric computation, such as initializing the counters responsible for keeping track of the number of times various products were purchased. Furthermore, since the experimental implementation allows multiple filter criteria besides a common product purchase (e.g., a common product webpage browsed), it uses additional data structures such as bitmaps to refine the set of customers who are related in some way to the seed customer in Step 1. Computations such as these exercise the non-graph aspects of the engine, which the inventors believe increase the application realism of the experiments, as many real-world analytics problems require both graph and non-graph based computation. To avoid trivial non-graph computations such as disk I/O from dominating the graph-based ones in wall-clock seconds, the inventors did not configure system 100 to output the results and write them to a file stored on disk, although the inventors verified that the results written to the file would have been exactly the same as the correct ones for the two configurations tested below.

The customer-bought-product graph used in the experiments has about 24.4 million edges in one traversal direction. Thus, the total number of edges stored is about 24.4×2=48.8 million edges for traversals in both directions. There are about 3 million unique customers and over 400K unique products (at the SKU level). System 100 chose a set of 100 random customers as different seeds of the query used in Step 1, and the average wall-clock seconds were recorded and compared between two configurations of the same engine. In one configuration the engine computes and leverages the frontier hints as described in this disclosure, and in the other configuration such hints are never computed and instead the engine always performs a full scan of all the vertices just to find those on the frontier. The test machine used is the same one reported earlier that has an Intel Xeon E3-1225 3.1 GHz processor with 4 cores and 8 GB of RAM.

While it may seem that the frontier hints are just one of the many low-level optimization tricks one could use to speed up the engine, it turns out that these hints are significant in terms of their impact on the traversal speed. The average wall-clock time for processing 100 random seed customers is 24 milliseconds without frontier hints, and 14 milliseconds with the hints, which is about 1.7× faster. As mentioned earlier, a number of computation steps, including memory initialization and customer filtering, are common in both configurations and have exactly the same speed. Thus, the relative speed advantage of frontier hints in terms of pure graph traversal should be greater than 1.7×. Furthermore, the test machine only has 4 cores, so the maximum parallel speed-up is limited to 4×. However, with more cores, it is likely that the frontier hints can achieve even greater speed increases.

Exemplary Process for Generating Bitmasks

Figure 9:
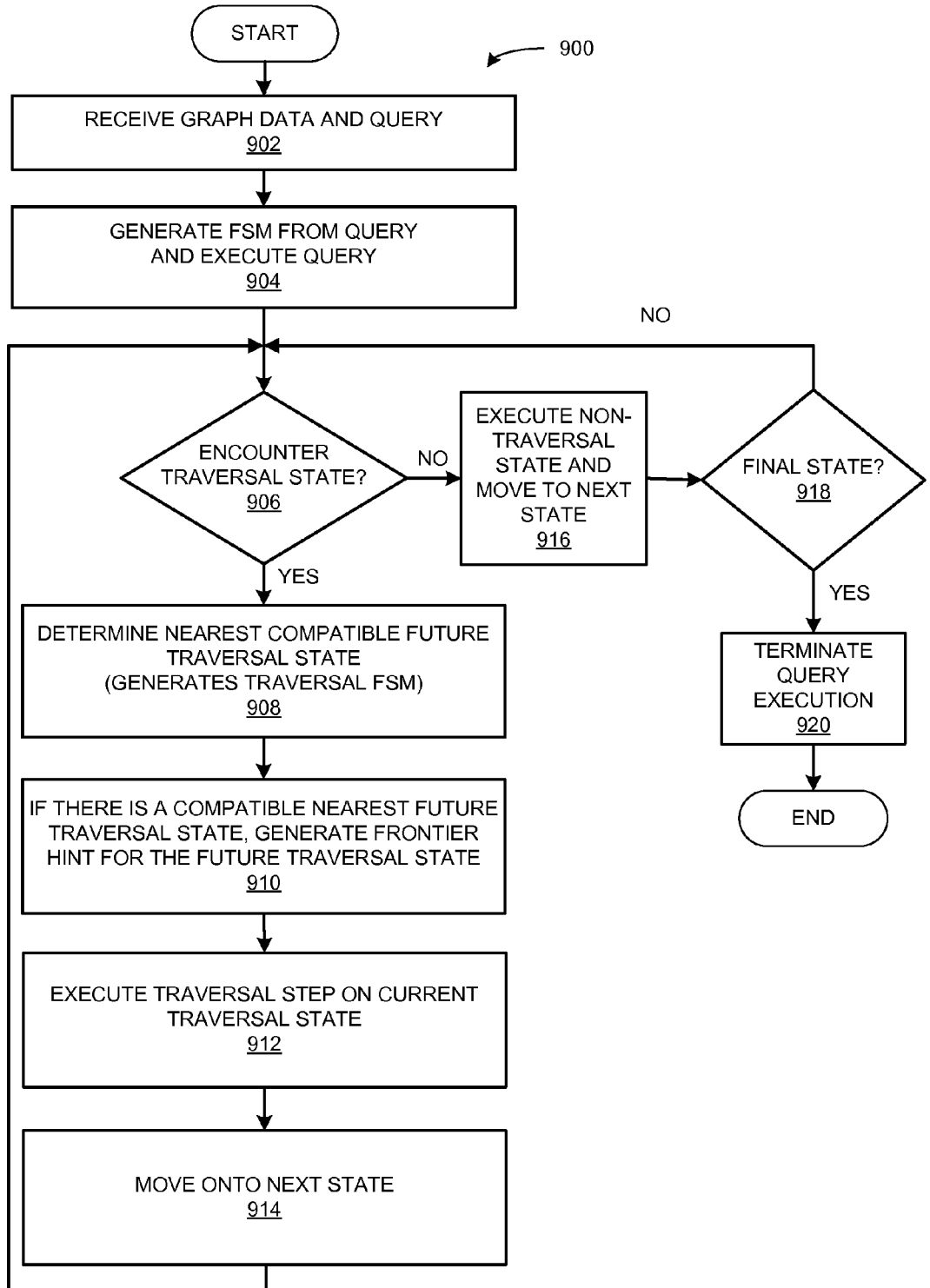
FIG. 9 presents a flowchart illustrating an exemplary process for generating bitmasks for compatible future traversal steps, according to an embodiment.

FIG. 9 presents a flowchart illustrating an exemplary process for generating bitmasks for compatible future traversal steps, according to an embodiment. During operation, system 100 initially receives graph data and query (operation 902). System 100 may obtain the graph data through user input or as previously stored graph data or through any other method. Next, system 100 generates a FSM from the query and executes the query (operation 904).

When system 100 encounters a traversal state (operation 906), system 100 will determine the nearest compatible future traversal state (operation 908). As part of determining the nearest compatible future traversal state, system 100 may call the function find-compatible-traversal-state, which generates a traversal FSM. Note that the function will terminate the search for the compatible traversal state if it detects an anti-traversal state. If there is a compatible nearest future traversal state, then system 100 generates a frontier hint for that future traversal state (operation 910). System 100 then executes the traversal step on current traversal state (operation 912), and moves onto the next state (operation 914).

If system 100 does not encounter a traversal state in operation 906, then system 100 executes the non-traversal state and moves onto the next state (operation 916). If the next state is a final state (operation 918), then system 100 may terminate query execution (operation 920). Otherwise, the next state is not the final state and system 100 continues with operation 906.

Exemplary Apparatus

Figure 10:
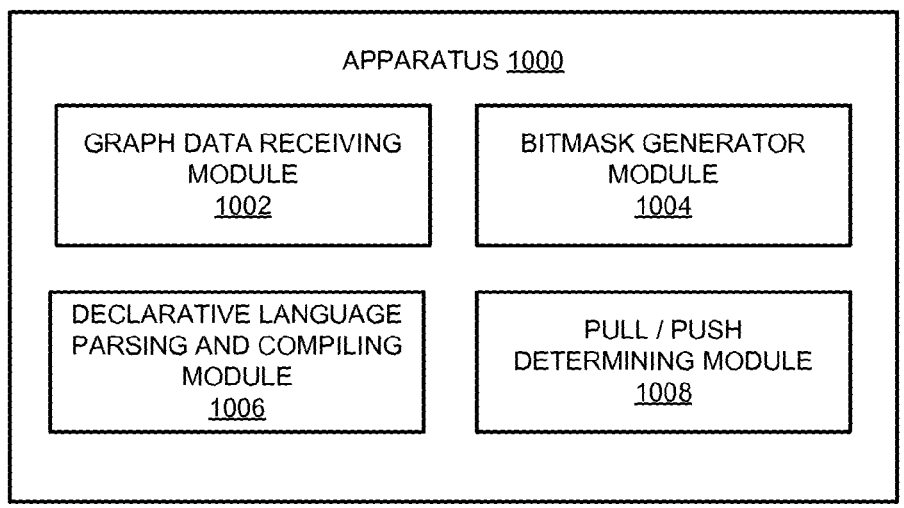
FIG. 10 presents a block diagram illustrating an exemplary apparatus that facilitates scalable graph traversal, in accordance with an embodiment.

FIG. 10 presents a block diagram illustrating an exemplary apparatus 1000 that facilitates scalable graph traversal, in accordance with an embodiment. Apparatus 1000 can comprise a plurality of modules which may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices. Specifically, apparatus 1000 can comprise a graph data receiving module 1002, a bitmask generator module 1004, a declarative language parsing and compiling module 1006, and a pull/push determining module 1008. These modules may form part of the engine described herein. Note that apparatus 1000 may also include additional modules not depicted in FIG. 10.

In some embodiments, graph data receiving module 1002 can receive the data describing vertices and edges of a graph. Bitmask generating module 1004 can generate the bitmask for future traversal steps using the techniques described herein. Declarative language parsing and compiling module 1006 parses and compiles the queries received in a declarative language. Pull/push determining module 1008 determines whether to pull or push for traversal steps. Note that graph management modules 102 illustrated in FIG. 1 may provide any and all functions of the various modules depicted in FIG. 10.

Exemplary System

Figure 11:
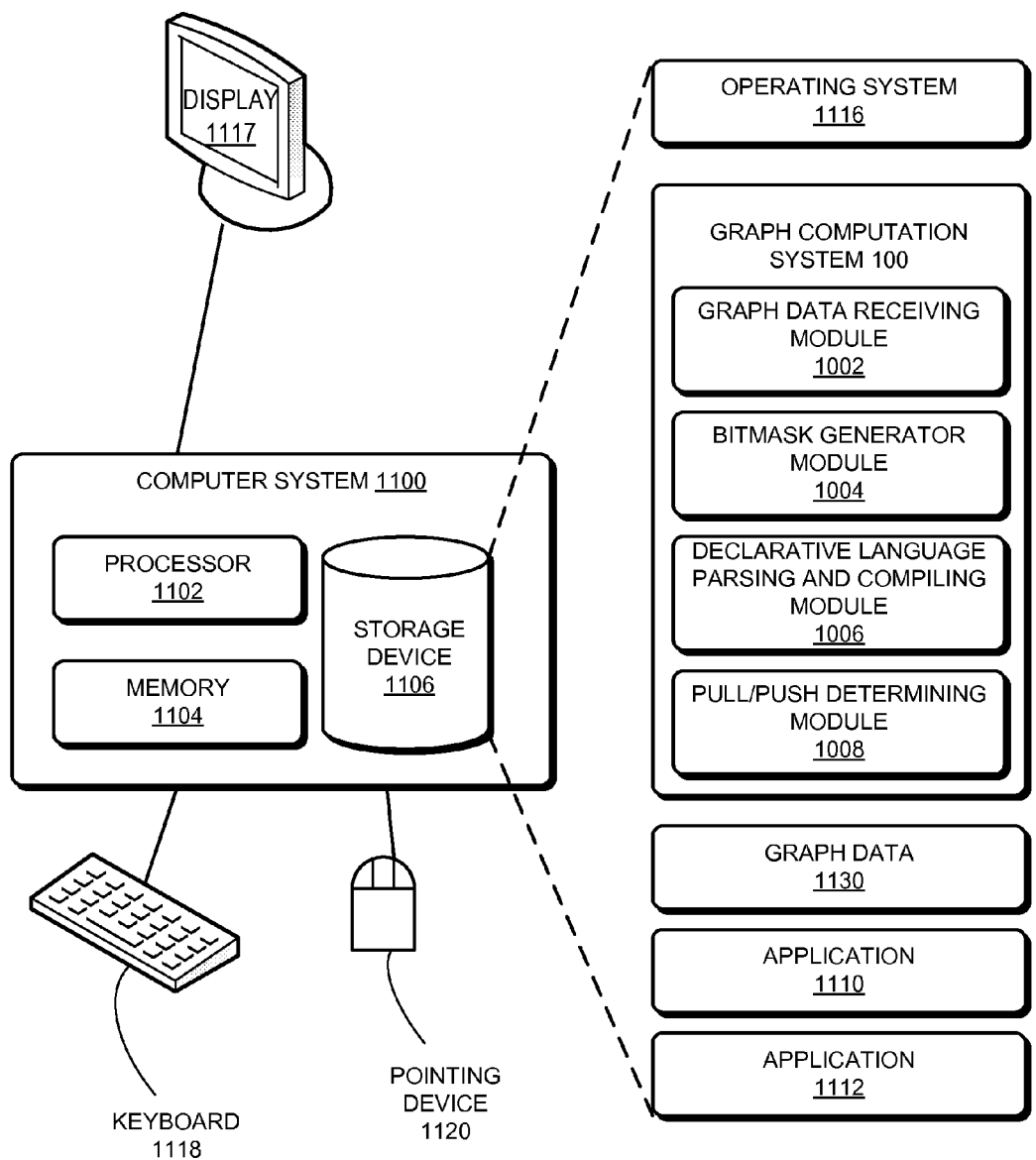
FIG. 11 illustrates an exemplary computer system that facilitates scalable graph traversal, in accordance with an embodiment.

FIG. 11 illustrates an exemplary computer system 1100 that facilitates scalable graph traversal, in accordance with an embodiment. In one embodiment, computer system 1100 includes a processor 1102, a memory 1104, and a storage device 1106. Storage device 1106 stores a number of applications, such as applications 1110 and 1112 and operating system 1116. Storage device 1106 also stores graph computation system 100, which may include a graph data receiving module 1002, bitmask generator module 1004, declarative language parsing and compiling module 1006, and pull/push determining module 1108. During operation, one or more applications, such as graph computation system 100, are loaded from storage device 1106 into memory 1104 and then executed by processor 1102. While executing the program, processor 1102 performs the aforementioned functions. Computer and communication system 1100 may be coupled to an optional display 1117, keyboard 1118, and pointing device 1120.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for generating a product recommendation, comprising:
   receiving graph data indicating vertices and edges of the graph, wherein the vertices represent customers and products and the edges represent purchases;

receiving a query of the graph to determine a product recommendation;
generating a finite-state machine (FSM) based on the query;
executing the query;
determining whether a current state of the FSM is a traversal state;
in response to the current state being a traversal state, generating a traversal FSM;
searching the traversal FSM for a nearest future traversal state;
generating a bitmask for the future traversal state; and
utilizing the generated bitmask when executing the future traversal state to generate the product recommendation.

2. The method of claim 1, further comprising:
determining whether to perform pull or push traversals by computing a ratio $\alpha \cdot \beta$, wherein $\alpha$=a ratio between a number of sender vertices and a total number of vertices of the graph, and $\beta$=a ratio between average random write time and average random read time of the computer executing the method; and
performing push traversals if $\alpha \cdot \beta < 1$; and
performing pull traversals if $\alpha \cdot \beta > 1$.

3. The method of claim 1, wherein the query of the graph is expressed with a declarative language.

4. The method of claim 1, wherein searching for a nearest future traversal state further comprises:
determining that the current traversal state is compatible with the nearest future traversal state in that the current traversal state and the nearest future traversal state are associated with equal graphs.

5. The method of claim 1, wherein generating the bitmask comprises setting bit flags associated with vertex ranges according to an equation $\lfloor (ID(v)-v_{min-src})/n \rfloor = p$, wherein $ID(v)$ is an identifier value for vertex v, $v_{min-src}$ is a minimum identifier value of a set of source vertices, n is average number of vertices assigned to each processor, and p is an identifier value for a processor.

6. The method of claim 1, wherein generating the traversal FSM further comprises applying a total ordering to one or more states of the FSM to generate states of the traversal FSM.

7. The method of claim 1, wherein the query includes both partition-bounded primitives and partition-unbounded primitives, and the graph includes multiple edge partitions, the method further comprising:
determining whether a primitive is partition-bounded or partition-unbounded;
upon determining that the primitive is partition-bounded, assigning each processor to a range of vertices $\in [v^p_{min-src}, v^p_{max-src}]$, where $v^p_{min-src}$ and $v^p_{max-src}$ are a minimum integer identifier and a maximum integer identifier of source vertices in a graph partition p; and
upon determining that the primitive is partition-unbounded, for each partition, assigning vertices to processors according to an equation $\lfloor (ID(v)-v_{min-src})/n \rfloor = p$, wherein $ID(v)$ is an identifier value for vertex v, $v_{min-src}$ is a minimum identifier value of a set of source vertices, n is average number of vertices assigned to each processor, and p is an identifier value for a processor.

8. The method of claim 7, wherein the partition-bounded primitive is a push primitive and the partition-unbounded primitive is a pull primitive.

9. The method of claim 1, further comprising:
receiving data indicating a new primitive and input/output arguments of the new primitive; and
adding the new primitive to a set of primitives.

10. A tangible computer-readable storage medium storing instructions that when executed by a computer cause the computer to perform a method for generating a product recommendation, the method comprising:
receiving graph data indicating vertices and edges of the graph, wherein the vertices represent customers and products and the edges represent purchases;
receiving a query of the graph to determine a product recommendation;
generating a finite-state machine (FSM) based on the query;
executing the query;
determining whether a current state of the FSM is a traversal state;
in response to the current state being a traversal state, generating a traversal FSM;
searching the traversal FSM for a nearest future traversal state;
generating a bitmask for the future traversal state; and
utilizing the generated bitmask when executing the future traversal state to generate the product recommendation.

11. The computer-readable storage medium of claim 10, wherein the computer-readable storage medium stores additional instructions that, when executed, cause the computer to perform additional steps comprising:
determining whether to perform pull or push traversals by computing a ratio $\alpha \cdot \beta$, wherein $\alpha$=a ratio between a number of sender vertices and a total number of vertices of the graph, and $\beta$=a ratio between average random write time and average random read time of the computer executing the method; and
performing push traversals if $\alpha \cdot \beta < 1$; and
performing pull traversals if $\alpha \cdot \beta > 1$.

12. The computer-readable storage medium of claim 10, wherein the query of the graph is expressed with a declarative language.

13. The computer-readable storage medium of claim 10, wherein
searching for a nearest future traversal state further comprises:
determining that the current traversal state is compatible with the nearest future traversal state in that the current traversal state and the nearest future traversal state are associated with equal graphs.

14. The computer-readable storage medium of claim 10, wherein generating the bitmask comprises setting bit flags associated with vertex ranges according to an equation $\lfloor (ID(v)-v_{min-src})/n \rfloor = p$, wherein $ID(v)$ is an identifier value for vertex v, $v_{min-src}$ is a minimum identifier value of a set of source vertices, n is average number of vertices assigned to each processor, and p is an identifier value for a processor.

15. The computer-readable storage medium of claim 10, wherein generating the traversal FSM further comprises applying a total ordering to one or more states of the FSM to generate states of the traversal FSM.

16. The computer-readable storage medium of claim 10, wherein the query includes both partition-bounded primitives and partition-unbounded primitives, and the graph includes multiple edge partitions, and wherein the computer-readable storage medium stores additional instructions that, when executed, cause the computer to perform additional steps comprising:
determining whether a primitive is partition-bounded or partition-unbounded;
upon determining that the primitive is partition-bounded, assigning each processor to a range of vertices $\in [v^p_{min-src}, v^p_{max-src}]$, where $v^p_{min-src}$ and $v^p_{max-src}$ are a minimum integer identifier and a maximum integer identifier of source vertices in a graph partition p; and upon determining that the primitive is partition-unbounded, for each partition, assigning vertices to processors according to an equation $\lfloor (ID(v)-v_{min-src})/n \rfloor = p$, wherein $ID(v)$ is an identifier value for vertex v, $v_{min-src}$ is a minimum identifier value of a set of source vertices, n is average number of vertices assigned to each processor, and p is an identifier value for a processor.

17. The computer-readable storage medium of claim 10, wherein the computer-readable storage medium stores additional instructions that, when executed, cause the computer to perform additional steps comprising:

receiving data indicating a new primitive and input/output arguments of the new primitive; and adding the new primitive to a set of primitives.

18. A computing system for generating a product recommendation, the system comprising:

one or more processors, a computer-readable medium coupled to the one or more processors having instructions stored thereon that, when executed by the one or more processors, cause the one or more processors to perform operations comprising:

receiving graph data indicating vertices and edges of the graph, wherein the vertices represent customers and products and the edges represent purchases;

receiving a query of the graph to determine a product recommendation;

generating a finite-state machine (FSM) based on the query;

executing the query;

determining whether a current state of the FSM is a traversal state;

in response to the current state being a traversal state, generating a traversal FSM;

searching the traversal FSM for a nearest future traversal state;

generating a bitmask for the future traversal state; and utilizing the generated bitmask when executing the future traversal state to generate the product recommendation.

19. The computing system claim 18, wherein the computer-readable storage medium stores additional instructions that, when executed, cause the computer to perform additional steps comprising:

determining whether to perform pull or push traversals by computing a ratio $\alpha \cdot \beta$, wherein $\alpha$=a ratio between a number of sender vertices and a total number of vertices of the graph, and $\beta$=a ratio between average random write time and average random read time of the computer executing the method; and performing push traversals if $\alpha \cdot \beta < 1$; and performing pull traversals if $\alpha \beta > 1$.

20. The computing system of claim 18, wherein the query of the graph is expressed with a declarative language.

21. The computing system of claim 18, wherein searching for a nearest future traversal state further comprises:

determining that the current traversal state is compatible with the nearest future traversal state in that the current traversal state and the nearest future traversal state are associated with equal graphs.

22. The computing system of claim 18, wherein generating the bitmask comprises setting bit flags associated with vertex ranges according to an equation $\lfloor (ID(v)-vmin-src)/n \rfloor = p$, wherein $ID(v)$ is an identifier value for vertex v, vmin-src is a minimum identifier value of a set of source vertices, n is average number of vertices assigned to each processor, and p is an identifier value for a processor.

23. The computing system of claim 18, wherein generating the traversal FSM further comprises applying a total ordering to one or more states of the FSM to generate states of the traversal FSM.

24. The computing system of claim 18, wherein the query includes both partition-bounded primitives and partition-unbounded primitives, and the graph includes multiple edge partitions, and wherein the computer-readable storage medium stores additional instructions that, when executed, cause the computer to perform additional steps comprising:

determining whether a primitive is partition-bounded or partition-unbounded;

upon determining that the primitive is partition-bounded, assigning each processor to a range of vertices $\in [v^p_{min-src}, v^p_{max-src}]$, where $v^p_{min-src}$ and $v^p_{max-src}$ are a minimum integer identifier and a maximum integer identifier of source vertices in a graph partition p; and upon determining that the primitive is partition-unbounded, for each partition, assigning vertices to processors according to an equation $\lfloor (ID(v)-v_{min-src})/n \rfloor = p$, wherein $ID(v)$ is an identifier value for vertex v, $v_{min-src}$ is a minimum identifier value of a set of source vertices, n is average number of vertices assigned to each processor, and p is an identifier value for a processor.

25. The computing system of claim 18, wherein the computer-readable storage medium stores additional instructions that, when executed, cause the computer to perform additional steps comprising:

receiving data indicating a new primitive and input/output arguments of the new primitive; and adding the new primitive to a set of primitives.

* * * * *